(12) United States Patent
Tsai

(10) Patent No.: US 8,259,231 B2
(45) Date of Patent: Sep. 4, 2012

(54) PORTABLE NAVIGATION DEVICE WITH TV FUNCTION, PROCESSING MODULE AND OPERATION METHOD THEREOF

(75) Inventor: Hsien-Ming Tsai, Hsinchu Hsien (TW)

(73) Assignee: MStar Semiconductor, Inc, Hsinchu Hsien (TW)

(*) Notice: Subject to any disclaimer, the term of this patent is extended or adjusted under 35 U.S.C. 154(b) by 421 days.

(21) Appl. No.: 12/569,963

(22) Filed: Sep. 30, 2009

(65) Prior Publication Data

US 2010/0123827 A1    May 20, 2010

(30) Foreign Application Priority Data

Nov. 18, 2008   (TW) .............................. 97144577 A

(51) Int. Cl.
*H04N 7/00* (2006.01)
*H04N 11/00* (2006.01)

(52) U.S. Cl. ........ 348/552; 348/569; 348/723; 348/725; 348/730; 348/738; 348/51; 348/445; 348/156; 348/169; 348/172

(58) Field of Classification Search .................. 348/552, 348/723, 725, 730, 738, 51, 445, 569; 345/156, 345/169, 172
See application file for complete search history.

(56) References Cited

U.S. PATENT DOCUMENTS

| | | | |
|---|---|---|---|
| 6,321,077 B1* | 11/2001 | Saitoh et al. ................... | 455/345 |
| 6,424,913 B1* | 7/2002 | Fichter et al. .................. | 701/468 |
| 6,807,676 B1* | 10/2004 | Robbins et al. ................. | 725/39 |
| 2006/0066757 A1* | 3/2006 | Numata et al. ................. | 348/730 |
| 2009/0096811 A1* | 4/2009 | Tanaka et al. ................. | 345/629 |
| 2009/0265101 A1* | 10/2009 | Jow ............................... | 701/209 |
| 2009/0313658 A1* | 12/2009 | Nishimura et al. ............. | 725/59 |

* cited by examiner

*Primary Examiner* — Jefferey Harold
*Assistant Examiner* — Mustafizur Rahman
(74) *Attorney, Agent, or Firm* — WPAT, PC; Justin King

(57) ABSTRACT

A portable navigation device with a TV function includes a TV module, a navigation module, a display module, a sound module, a first processing unit, a second processing unit and a TV command storage module. The TV module generates baseband TV signals, the navigation module generates position information, the display module displays image information, the sound module plays sounds, the first processing unit performs navigation programs, the second processing unit performs TV programs, and the TV command storage module stores TV commands from the first processing unit and the second processing unit. TV command transmission between the first processing unit and the second processing unit is achieved by sending interrupt signals or reset signals.

6 Claims, 11 Drawing Sheets

PORTABLE NAVIGATION DEVICE WITH TV FUNCTION, PROCESSING MODULE AND OPERATION METHOD THEREOF

CROSS REFERENCE TO RELATED PATENT APPLICATION

This patent application is based on Taiwan, R.O.C. patent application No. 97144577 filed on Nov. 28, 2008.

FIELD OF THE INVENTION

The present invention relates to a portable navigation device (PND) having dual processing units, and more particularly, to a PND having dual processing units for a navigation function and a TV function.

BACKGROUND OF THE INVENTION

A PND is a convenient tool for a driver. With preferred planned routes provided by the PND, the driver can obtain a current position and avoid getting lost or taking an undesired detour. In addition, by the PND a user can watch TV programs anywhere, in a vehicle or outdoors, no longer limited to indoors.

Nowadays, a PND with a TV function can be classified into several architecture types.

The first architecture is that a PND has two processing modules independent from each other. One processing module is used for processing Global Positioning System (GPS) signals from satellites; the other processing module is used for processing TV signals. Both of the processing modules, without sharing interface, have respective elements such as a display interface, a sound interface or a data bus. Therefore, the first architecture suffers from disadvantages of having high costs, large-area circuits, high degrees of design complexity, high power consumption and so on.

The second architecture is that a PND only has a single processing module which needs to be powerful enough to simultaneously process GPS signals and TV signals. The second architecture has disadvantages below. First of all, a high speed processing unit having high computation capability is needed; secondly, high power consumption by the processing unit is resulted from processing images and voices; last but not least, concurrent execution of a navigation function and a TV function is unlikely to be smooth with the single processing module.

Accordingly, it is preferred to provide a PND, which comprises dual processing units that share common system resources and is capable of providing a navigation function and a TV function. Such PND not only solves the foregoing problem and other problems of the prior art, but also has advantages that are not provided by the conventional technology.

SUMMARY OF THE INVENTION

A PND having two processing units for a navigation function and a TV function is provided according to the present invention. Communication between the processing units is achieved by sending interrupt signals or reset signals.

A first aspect of the present invention is to provide a PND with a TV function. A portable navigation device (PND) with a TV function, comprises a data bus; a TV module, coupled to the data bus, for receiving and processing TV signals to generate baseband TV signals; a navigation module, coupled to the data bus, for receiving and processing satellite signals to generate position data; a display module, coupled to the data bus, for displaying image related to one of the baseband TV signals and the position data; a sound module, coupled to the data bus, for playing sound related to one of the baseband TV signals and the position data; a storage module, coupled to the data bus, for storing TV programs and data, and navigation programs and data; a first processing unit, coupled to the data bus, for executing the navigation program to control the navigation module, the sound module, the display module and the storage module, and generating a first TV command according to a TV enable signal; a second processing unit, coupled to the data bus, for executing the TV program to control the TV module, the sound module, the display module and the storage module, and generating a second TV command according to a TV disable signal; a TV command storage module, coupled to the data bus, for storing the first TV command and the second TV command; a first interrupt controller, coupled to the first processing unit, for generating a first interrupt signal to the first processing unit according to the second TV command; and a second interrupt controller, coupled to the second processing unit, for generating a second interrupt signal to the second processing unit according to the first TV command.

A second aspect of the present invention is to provide a processing module applied to a PND with a TV function. A processing module, applied to a PND with a TV function, the PND further comprising a navigation module, a TV module, a storage module, a sound module and a display module, the processing module comprises a data bus; a display interface, coupled to the data bus, for controlling the display module to display image data related to one of baseband TV signals and position data; a sound interface, coupled to the data bus, for controlling the sound interface to play sound related to one of the baseband TV signals and the position data; a storage interface, coupled to the data bus, for controlling the storage module to store TV programs and data and navigation programs and data; a first processing unit, coupled to the data bus, for executing navigation programs to control the navigation interface, the sound interface, the display interface and the storage interface, and generating a first command according to a TV function enable signal; a second processing unit, coupled to the data bus, for executing a TV associated program, controlling the TV module, controlling the sound module, the display module and the storage module via the sound interface, the display interface and the storage interface, and generating a second command according to a TV function disable signal; a TV command storage module, coupled to the data bus, for storing the first TV command and the second TV command; a first interrupt controller, coupled to the first processing unit, for generating a first interrupt signal to the first processing unit; and a second interrupt controller, coupled to the second processing unit, for generating a second interrupt signal to the second processing unit.

A third aspect of the present invention is to provide an processing method for a TV function of a PND. A TV function processing method for a PND with a TV function, wherein the PND comprises a first processing unit, a second processing unit, a navigation module, a TV module, a storage module, a sound module and a display module, and the first processing unit is used for handing a navigation function and generating a TV command, and the second processing unit is used for handling a TV function, the TV function activating method comprises steps of generating the TV command by the first processing unit according a TV enable signal; generating a signal from the first processing unit to the second processing unit; receiving the signal by the second processing unit; retrieving the TV command by the second processing unit; and controlling the TV module, the storage module, the sound module and the display module by the second processing unit according to the TV command to perform the TV function.

The advantages and spirit related to the present invention can be further understood via the following detailed description and drawings.

DETAILED DESCRIPTION OF THE PREFERRED EMBODIMENT

A PND having two processing units for a navigation function and a TV function is provided according to an embodiment of the present invention. One of the processing units is used for handling navigation function and the other processing unit is used for handling TV function. When one of the processing units operates in a normal mode, the other processing unit is in a power saving mode to reduce power consumption of the PND. In addition, communication between the processing units is achieved by sending interrupt signals or reset signals.

Figure 1:
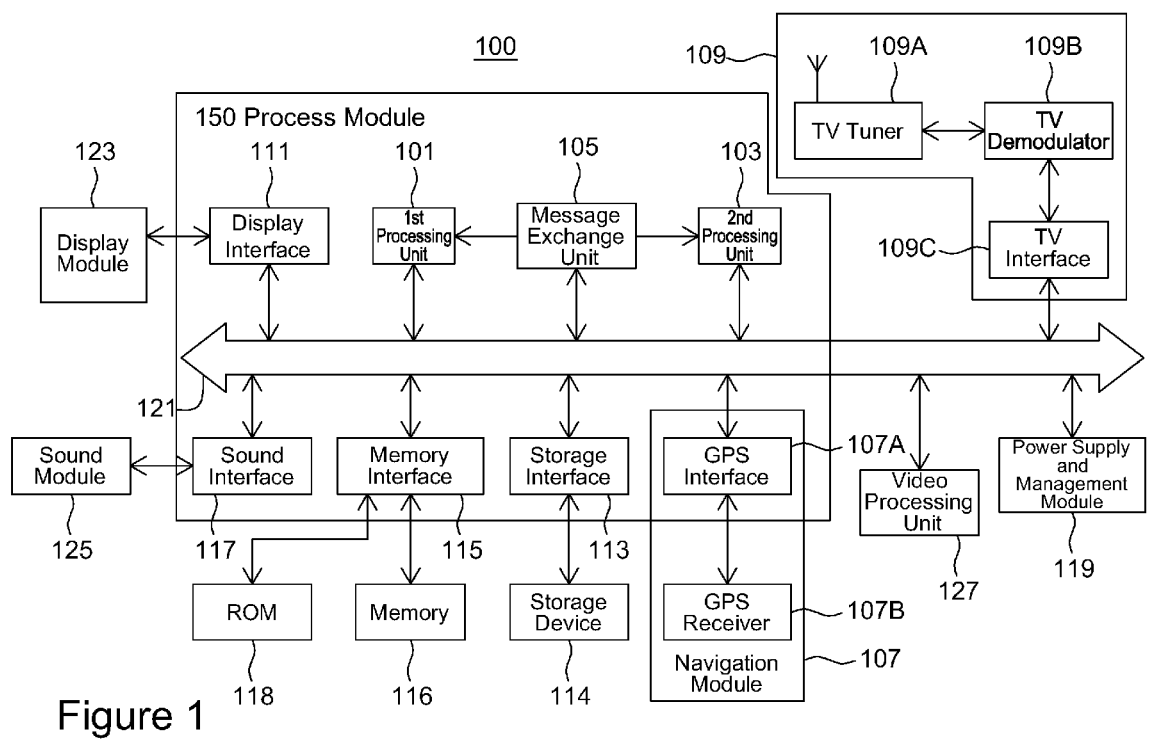
FIG. 1 is a block diagram of a PND according to a first embodiment of the present invention.

FIG. 1 is a block diagram of a PND 100 having two processing units according to a first embodiment of the present invention. In this embodiment, the power supplying to all elements in the PND 100 is provided by a single power supply and management module.

Referring to FIG. 1, the PND 100 comprises a first processing unit 101, a second processing unit 103, an message exchange unit 105, a navigation module 107, a TV module 109, a display interface 111, a storage interface 113, a storage device 114, a memory interface 115, a memory 116, a sound interface 117, a read only memory (ROM) 118, a power supply and management module 119, a bus 121, a display module 123, a sound module 125 and a video processing unit 127. Further, the TV module 109 comprises a TV tuner 109A, a TV modulator 109B and a TV interface 109C; the navigation module 107 comprises a GPS interface 107A and a GPS receiver 107B.

The first processing unit 101 controls the message exchange unit 105, the navigation module 107, the display interface 111, the storage interface 113, the storage device 114, the memory interface 115, the memory 116, the sound interface 117, the power supply and management module 119, the display module 123, the sound module 125 and the video processing unit 127 to be used for processing a navigation function.

The second processing unit 103 controls the message exchange unit 105, the TV module 109, the display interface 111, the storage interface 113, the storage device 114, the memory interface 115, the memory 116, the sound interface 117, the display module 123, the sound module 125 and the video processing unit 127 to be used for processing a TV function.

The message exchange unit 105 provides communication between the first processing unit 101 and the second processing unit 103. Operations of the message exchange unit 105 and communication between the processing units are to be described below.

The GPS receiver 107B receives and processes satellite signals to generate current position information, which is transmitted to the first processing unit 101 via the GPS interface 107A and the bus 121. The first processing unit 101 performs a navigation function according to the received current position information, controls the display interface 111 and the display module 123 to display a current position on the display module 123, and controls the sound interface 117 and the sound module 125 to play a navigation voice message.

The TV module 109 is coupled to the bus 121. The TV tuner 109A inside the TV module 109 receives TV signals. The TV modulator 109B de-modulates the received TV signals to generate baseband TV signals. The second processing unit 103 processes the baseband TV signals to displays TV video on the display module 123 via the display interface 111 and outputs TV audio from the sound module 125 via the sound interface 117.

The display interface 111 and the display module 123 are controlled by the first processing unit 101 to display a navigation image. In addition, the display interface 111 and the display module 123 are controlled by the second processing unit 103 to display a TV video.

The sound interface 117 and the sound module 125 are controlled by the first processing unit 101 to play a navigation voice. Moreover, the sound interface 117 and the sound module 125 are controlled by the second processing unit 103 to play a TV audio.

The first processing unit 101 and the second processing unit 103 access the storage device 114 via the storage interface 113. The first processing unit 101 and the second processing unit 103 share the storage device 114. Navigation programs and information needed by the first processing unit 101 are stored in the storage device 114, and TV programs and information needed by the second processing unit 103 are also stored in the storage device 114. The storage device 114 may be various types of memory cards, such as a secure digital (SD) card, for example. Therefore, the navigation and TV programs stored in the storage device 114 can be updated.

The first processing unit 101 and the second processing unit 103 access the memory 116 and the ROM 118 via the memory interface 115. The first processing unit 101 and the second processing unit 103 share the memory 116. The ROM 118 is used for storing with a boot code needed by the first processing unit 101. During a booting process, the first processing unit 101 executes the boot code accessed from the ROM 118 and stores system codes needed by the first processing unit 101 and the second processing unit 103 from the storage device 114 into the memory 116 such as a dynamic random access memory (DRAM).

The power supply and management module 119 provides power to all electronic elements inside the PND 100. The power supply and management module 119 is controlled by the first processing unit 101. When the PND 100 performs the navigation function, the TV function is temporarily not needed by the user. Under such circumstances, the second processing unit 103 locks a clock gating and waits for an interruption to enter the power saving mode, so as to reduce power consumption of the PND.

The bus 121 is coupled to the first processing unit 101, the second processing unit 103, the message exchange unit 105, the navigation module 107, the TV module 109, the display interface 111, the storage interface 113, the memory interface 115, the sound interface 117, the video processing unit 127 and the power supply and management module 119. The video processing unit 127 is applied for processing video data to reduce computing loading of the first processing unit 101 and the second processing unit 103.

Figure 2A:
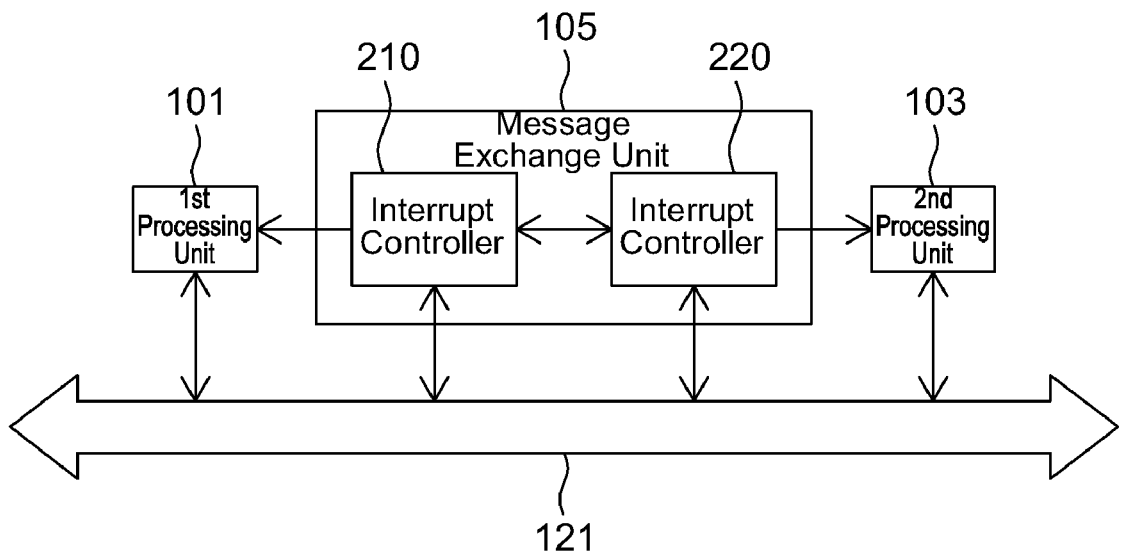
FIG. 2A is a schematic diagram of a first communication approach between dual processing units.
Figure 2B:
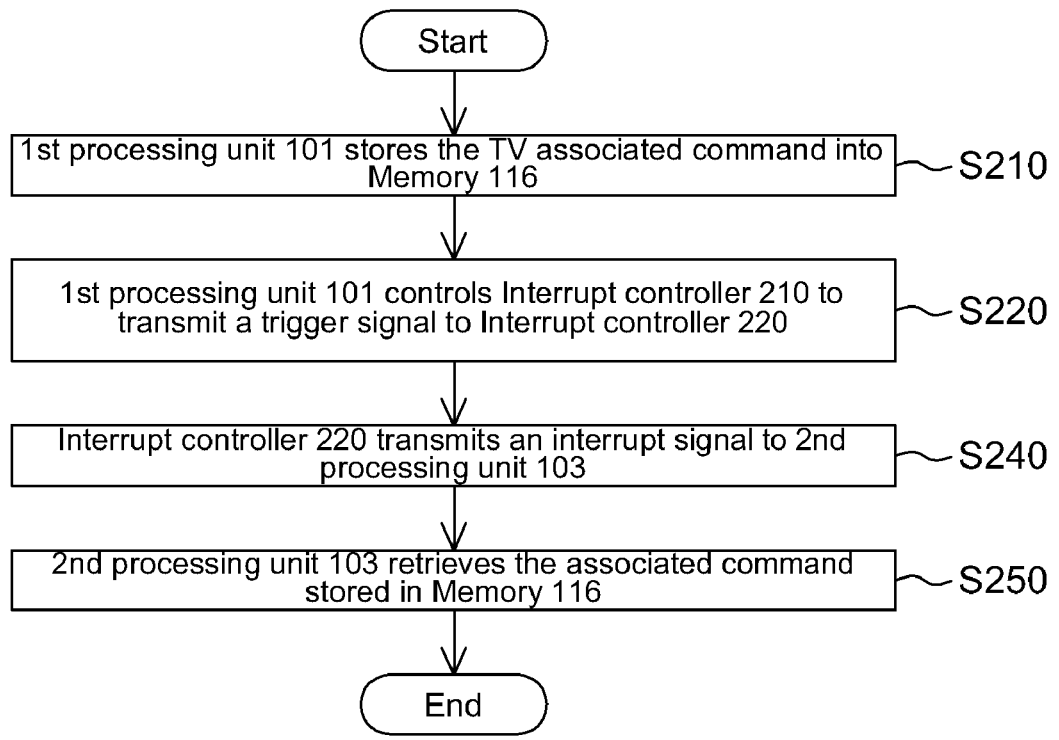
FIG. 2B is a flow chart of a communication process between dual processing units shown in FIG. 2A.
Figure 3A:
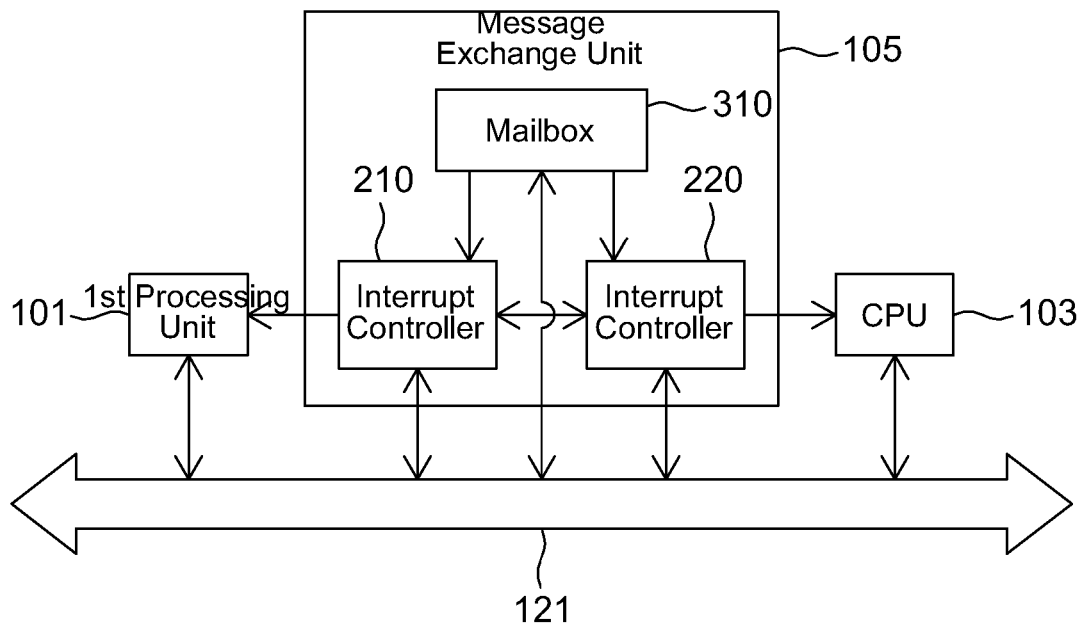
FIG. 3A is a schematic diagram of a second communication approach between dual processing units.
Figure 3B:
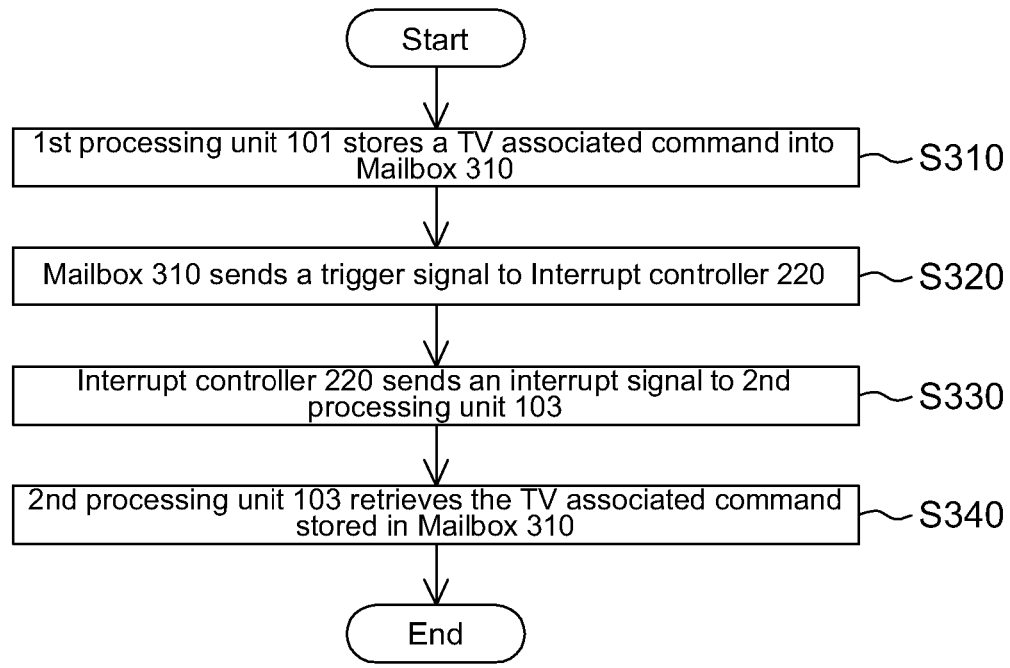
FIG. 3B is a flow chart of a communication process between dual processing units shown in FIG. 3A.

Refer to FIG. 2A to FIG. 3B to obtain a better understanding of the communication between the first processing unit 101 and the second processing unit 103 according to the first embodiment of the present invention. FIG. 2A is a schematic diagram of a first communication approach between the processing units. FIG. 2B is a flow chart of the communication between the processing units shown in FIG. 2A. FIG. 3A a schematic diagram of a second communication approach between the processing units. FIG. 3B is a flow chart of the communication between the processing units shown in FIG. 3A.

Referring to FIG. 2A, the message exchange unit 105 comprises interrupt controllers 210 and 220. Communication between the first processing unit 101, the second processing unit 103, the interrupt controller 210 and the interrupt controller 220 are illustrated in FIG. 2B.

Referring to FIG. 2B, in Step S210, the first processing unit 101 sends a TV associated command and stores the TV associated command into the memory 116. For example, the first processing unit 101 sends a TV enable command in response to a TV enable event triggered by the user. A format of the associated command is described below.

| Digital code | Command |
|---|---|
| 0xFF | None |
| 0x00 | TV enable command |
| 0x01 | TV disable command |
| 0x02 | Video open command |
| 0x03 | Video close command |
| 0x04~0xFE | Reserved |

In Step S220, the first processing unit 101 controls the interrupt controller 210 to transmit a trigger signal to the interrupt controller 220. In Step S240, the interrupt controller 220 transmits an interrupt signal to the second processing unit 103. In Step S250, the second processing unit 103 retrieves the associated command stored in the memory 116. Thus, because of the interrupt controller 220, the first processing unit 101 is able to indirectly send the associated command to the second processing unit 103 by sharing the memory 116.

Another communication approach between the processing units is to be described. Refer to FIGS. 3A and 3 B. The message exchange unit 105 comprises a mailbox 310, the interrupt controller 210 and the interrupt controller 220 as illustrated in FIG. 3A. The operation between the first processing unit 101, the second processing unit 103, the mailbox 310, the interrupt controller 210 and the interrupt controller 220 is illustrated in FIG. 3B.

The mailbox 310 is coupled to the bus 121, the interrupt controller 210 and the interrupt controller 220. The mailbox 310 stores message used for exchanging between the first processing unit 101 and the second processing unit 103.

In Step S310, the processing unit 101 stores a TV associated command into the mailbox 310 via the bus 121. In Step S320, upon receiving the TV associated command from the first processing unit 101, the mailbox 310 sends a trigger signal to the interrupt controller 220. In Step S330, the interrupt controller 220 sends an interrupt signal to the second processing unit 103. In Step S340, the second processing unit 103 retrieves the TV associated command stored in the mailbox 310 via the bus 121. Thus, the communication between the first processing unit 101 and the second processing unit 103 is completed so that the first processing unit 101 is able to indirectly send the TV associated command to the second processing unit 103 via the mailbox 310 and the interrupt controllers 220.

In FIG. 2B and FIG. 3B, the first processing unit 101 sends the TV associated command, which is received by the second processing unit 103. However, a person having ordinary skill in the art should understand that the second processing unit can also send the TV associated command to the first processing unit 101, as also being encompassed within the spirit and scope of the present invention.

Figure 4:
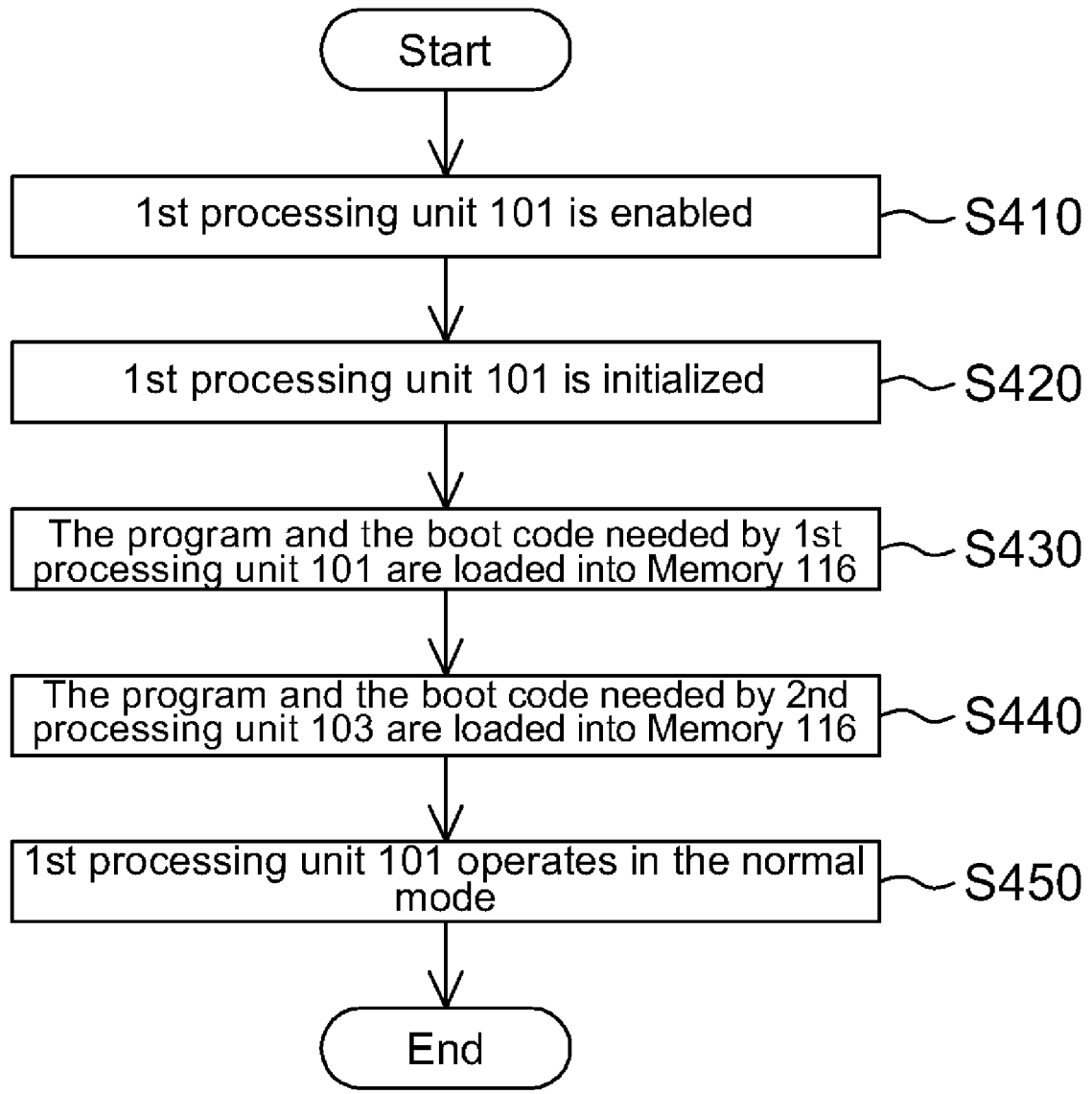
FIG. 4 is a boot flow chart of the first processing unit 101.

FIG. 4 is a flow chart of booting the first processing unit 101. In Step S410, the first processing unit 101 is enabled. In Step S420, the first processing unit 101 is initialized. In Step S430, the program and the boot code needed by the first processing unit 101 are loaded into the memory 116. In Step S440, the program and the boot code needed by the second processing unit 103 are loaded into the memory 116. In Step S450, the first processing unit 101 operates in the normal mode. While the first processing unit 101 is in the normal mode and the user has not triggered a TV enable event, the second processing unit 103 operates in the power saving mode.

Figure 5:
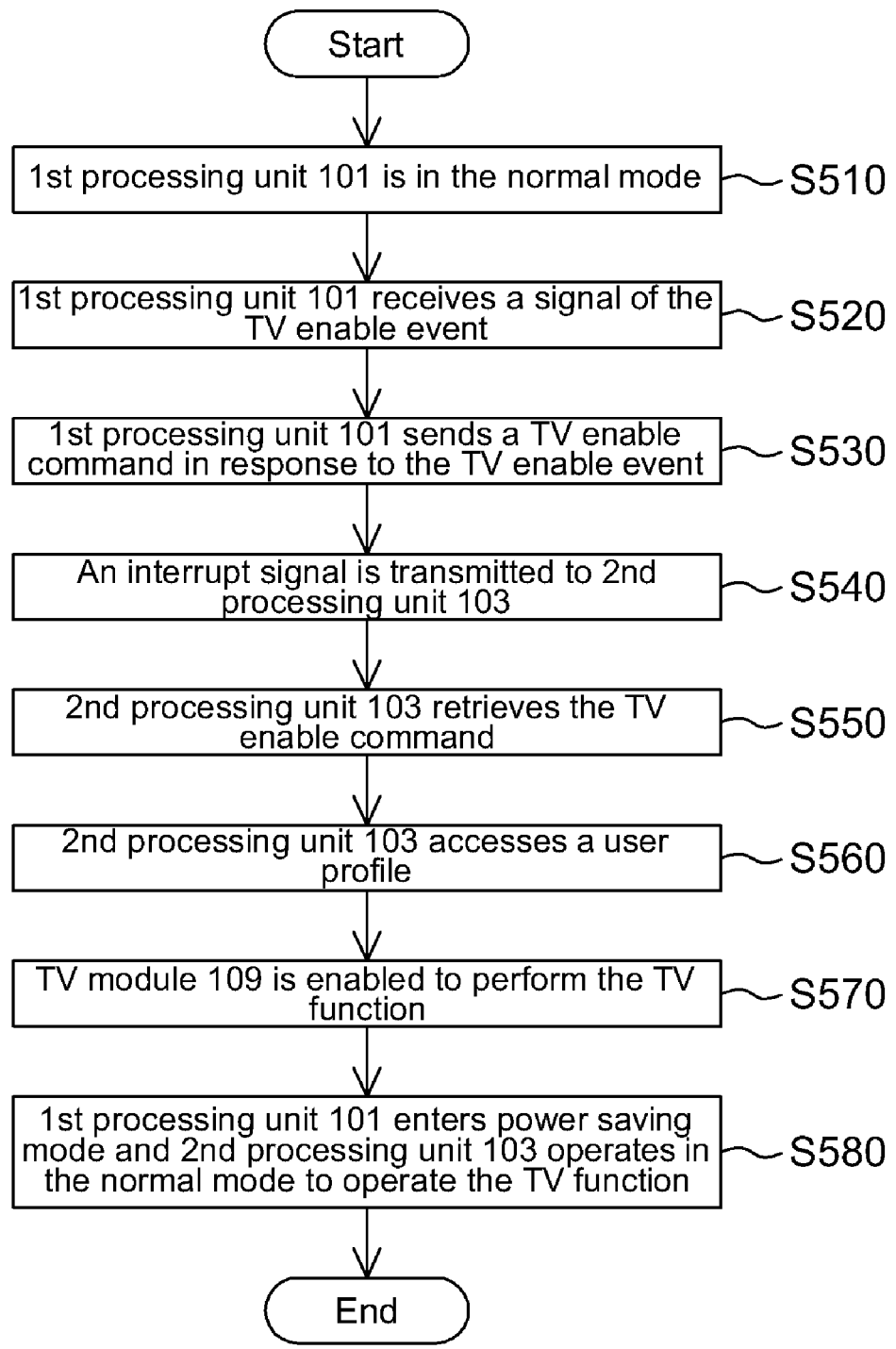
FIG. 5 is a flow chart of activating a TV function according to a first embodiment of the present invention.

Refer to FIG. 5 to get a better understanding of a TV boot flow according to the first embodiment of the present invention. FIG. 5 is a flow chart of booting a TV function according to the first embodiment of the present invention.

In Step S510, the first processing unit 101 is in the normal mode. At this point, the second processing unit 103 is in the power saving mode. In Step S520, the first processing unit 101 receives a signal of the TV enable event, e.g., the user's pushing of a TV power on/off button of the PND 100.

In Step S530, the first processing unit 101 sends a TV enable command in response to the TV enable event. The TV enable command is stored in the memory 116 or the mailbox 310.

In Step S540, in response to the TV enable command from the first processing unit 101, an interrupt signal is transmitted to the second processing unit 103 to activate the second processing unit 103. Refer to FIG. 2B and FIG. 3B for illustrations on sending the interrupt signal to the second processing unit 103—the description shall not be again given for brevity.

In Step S550, in response to the interrupt signal, the second processing unit 103 retrieves the TV enable command from the memory 116 or the mailbox 310.

In Step S560, the second processing unit 103 accesses a user profile from the storage device 114.

In Step S570, hardware, related to the TV function, such as the TV module 109, is enabled to perform the TV function.

In Step S580, when the user is watching TV and the navigation function is not needed temporarily, the first processing unit 101 enters the power saving mode. Moreover, the second processing unit 103 operates in the normal mode to operate the TV function of the PND 100.

Figure 6:
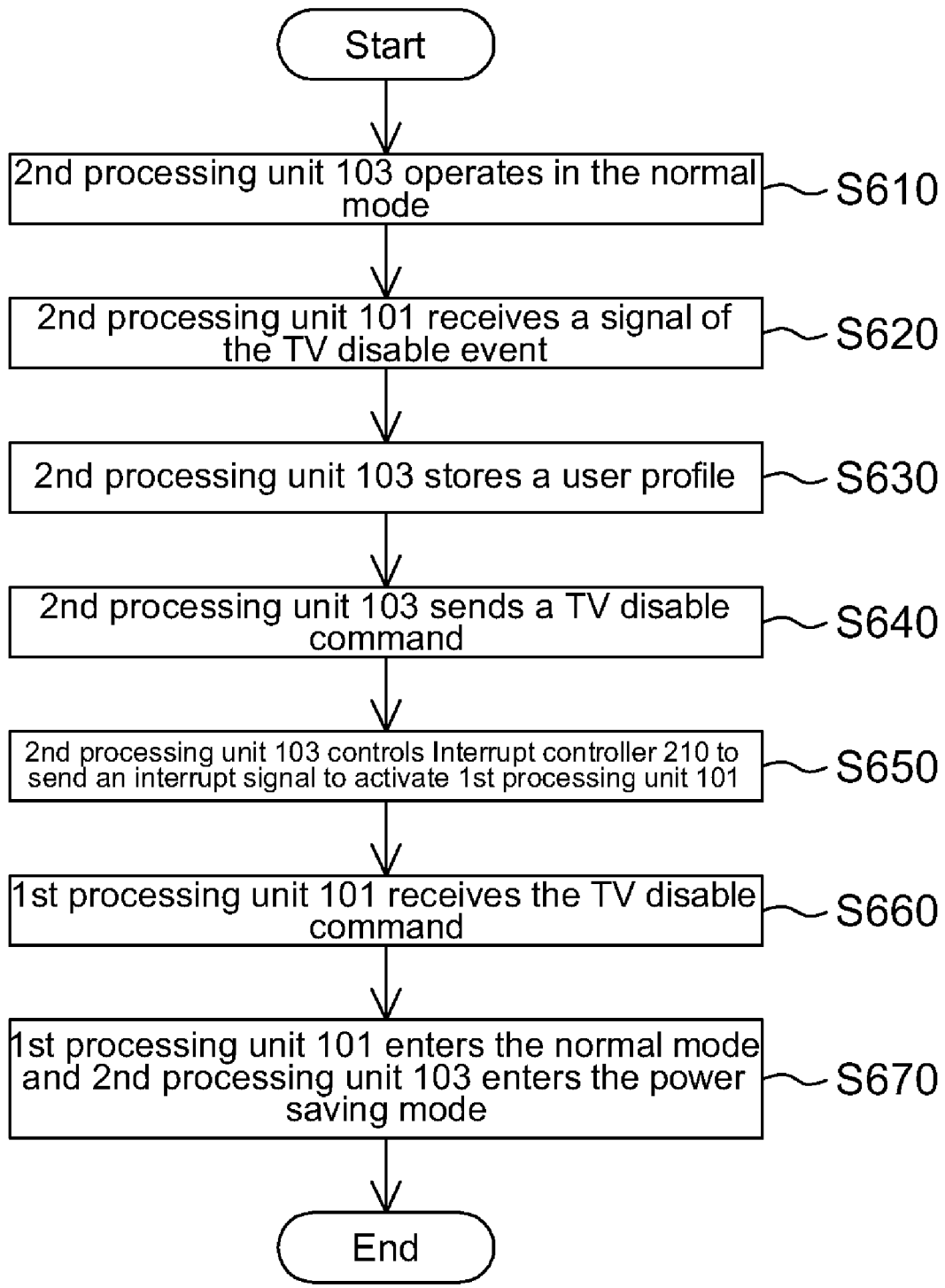
FIG. 6 is a flow chart of deactivating a TV function by a user according to a first embodiment of the present invention.
Figure 7:
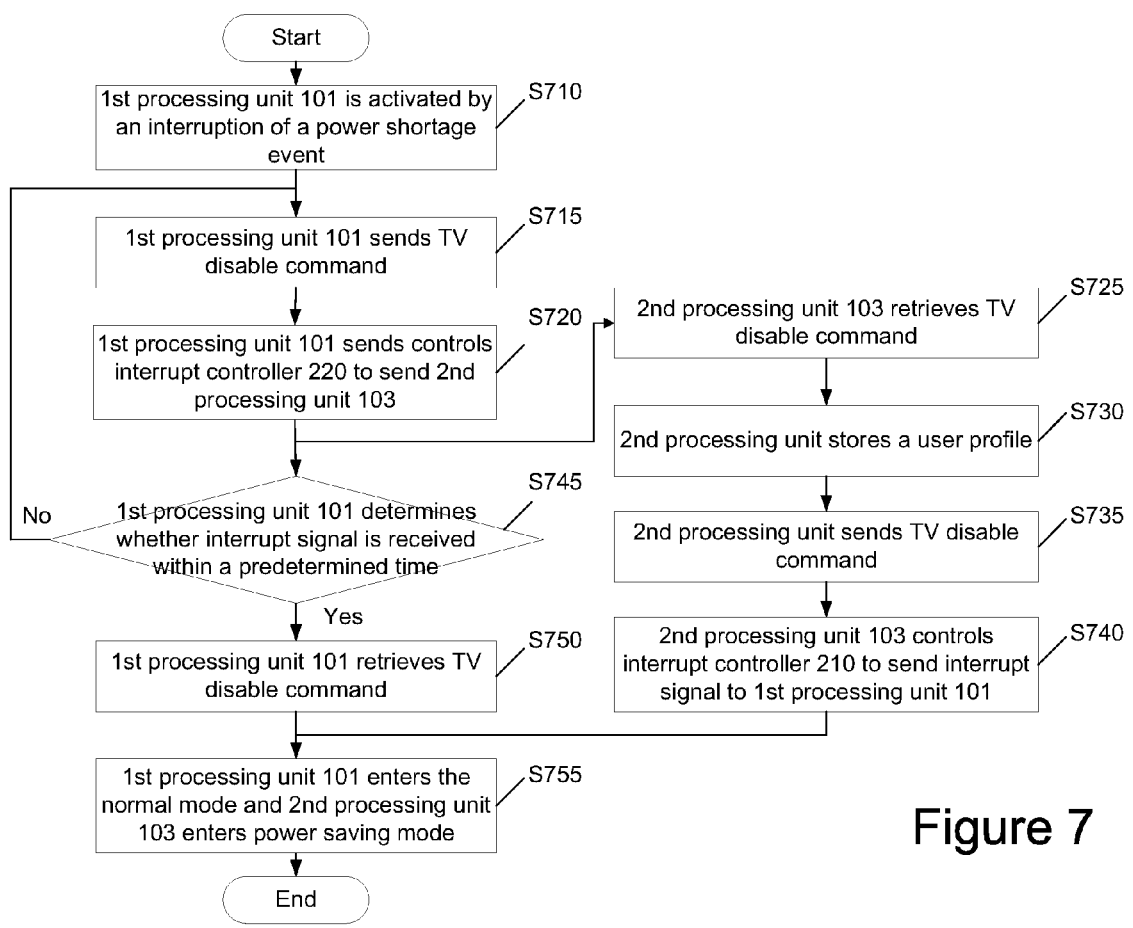
FIG. 7 is a flow chart of deactivating a TV function resulting from power shortage according to a first embodiment of the present invention.

Refer to FIG. 6 and FIG. 7 to obtain a better understanding of a TV function deactivating method according to the first embodiment of the present invention. In this embodiment, the TV disable event begins with the processing unit 103 when the TV disable event is triggered by the user as illustrated in FIG. 6, or begins with the processing unit 101 when the TV disable event is triggered for the reason that the PND 100 has power shortage as illustrated in FIG. 7.

FIG. 6 is a flow chart of deactivating the TV function by the user according to the first embodiment of the present invention. In Step S610, when the user watches TV via the PND 100, the second processing unit 103 operates in the normal mode and the first processing unit 101 operates in the power saving mode as described.

In Step S620, the user triggers a TV associated event, such as by pushing a TV power on/off button of the PND 100.

In Step S630, the second processing unit 103 stores a user profile. For example, the second processing unit 103 stores the user profile into the storage device 114.

In Step S640, the second processing unit 103 sends a TV disable command.

In Step S650, the second processing unit 103 controls the interrupt controller 210 to send an interrupt signal to activate the first processing unit 101. Refer to FIGS. 2B and 3B showing the communication between the first processing unit 101 and the second processing unit 103—the description shall not be again given for brevity.

In Step S660, the first processing unit 101 retrieves/receives the TV disable command from the memory 116 or the mailbox 310.

In Step S670, the first processing unit 101 in the normal mode controls the PND 100 to deactivate the TV function according to the TV disable command as retrieved. In addition, in Step S670, the second processing unit 103 enters the power saving mode for power saving purpose.

FIG. 7 is a flow chart of deactivating the TV function for the reason of having power shortage according to the first embodiment of the present invention. In Step S710, an interruption of a power shortage event shall activate the first processing unit 101. The power supply and management module 119 then detects the remaining power of the PND 100. When the remaining power is insufficient, the power supply and management module 119 sends an interrupt signal to the first processing unit 101 to wake up the first processing unit 101 originally operating in the power saving mode.

In Step S715, the first processing unit 101 sends the TV disable command indirectly transmitted to the second processing unit 103, so as to deactivate the TV function.

In Step S720, the first processing unit 101 controls the interrupt controller 220 to send the interrupt signal to the second processing unit 103.

In Step S725, the second processing unit 103 retrieves the TV disable command.

In Step S730, the second processing unit stores a user profile. In Step S735, the second processing unit sends the TV disable command indirectly transmitted to the first processing unit 101.

In Step S740, the second processing unit 103 controls the interrupt controller 210 to send the interrupt signal to the first processing unit 101.

In Step S745, the first processing unit 101 determines whether the interrupt signal is received within a predetermined time. When the result of Step S745 is no, the first processing unit 101 considers the second processing unit 103 does not receive the TV disable command, and the first processing unit 101 sends the TV disable command again. Thus, the flow returns to Step S715. When the result of Step S745 is yes, the first processing unit 101 considers the second processing unit 103 has received the TV disable command so that the flow goes to Step S750.

In Step S750, the first processing unit 101 retrieves the TV disable command.

In Step S755, the first processing unit 101 enters the normal mode and controls the PND 100 to deactivate the TV function according to the retrieved TV disable command. In addition, the second processing unit 103 enters the power saving mode in Step S755 for power saving purpose.

Figure 8:
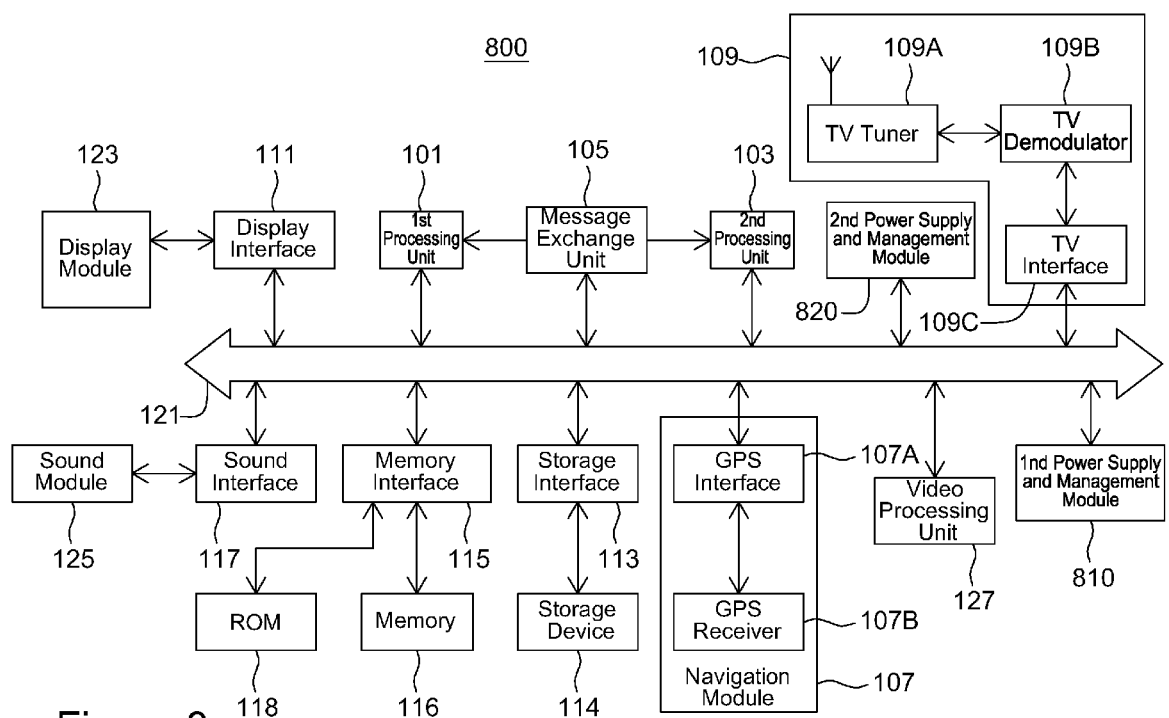
FIG. 8 is a block diagram of a PND according to a second embodiment of the present invention.

FIG. 8 is a block diagram of a PND 800 according to a second embodiment of the present invention. Elements of the PND 800 are the same as or similar to that of the PND 100, and details thereof shall not be described for brevity.

In the second embodiment, the elements inside the PND 800 belong to two power fields. Power supply and management of a first power field is controlled by a first power supply and management module 810, and power supply and management of a second power field is controlled by a second power supply and management module 820.

In the second embodiment, the first processing unit 101, the message exchange unit 105, the navigation module 107, the display interface 111, the storage interface 113, the storage device 114, the memory interface 115, the memory 116, the sound interface 117, the ROM 118, the display module 123 and the sound module 125 belong to the first power field. When the PND 800 performs the navigation function, the first power supply and management module 810 provides a power supply for the elements that belong to the first power field.

In addition, the TV module 109, the second processing unit 103 and the message exchange unit 105 belong to the second power field. When the PND 800 performs the TV function, the second power supply and management module 820 provides a power supply for the elements that belong to the second power field.

Figure 9:
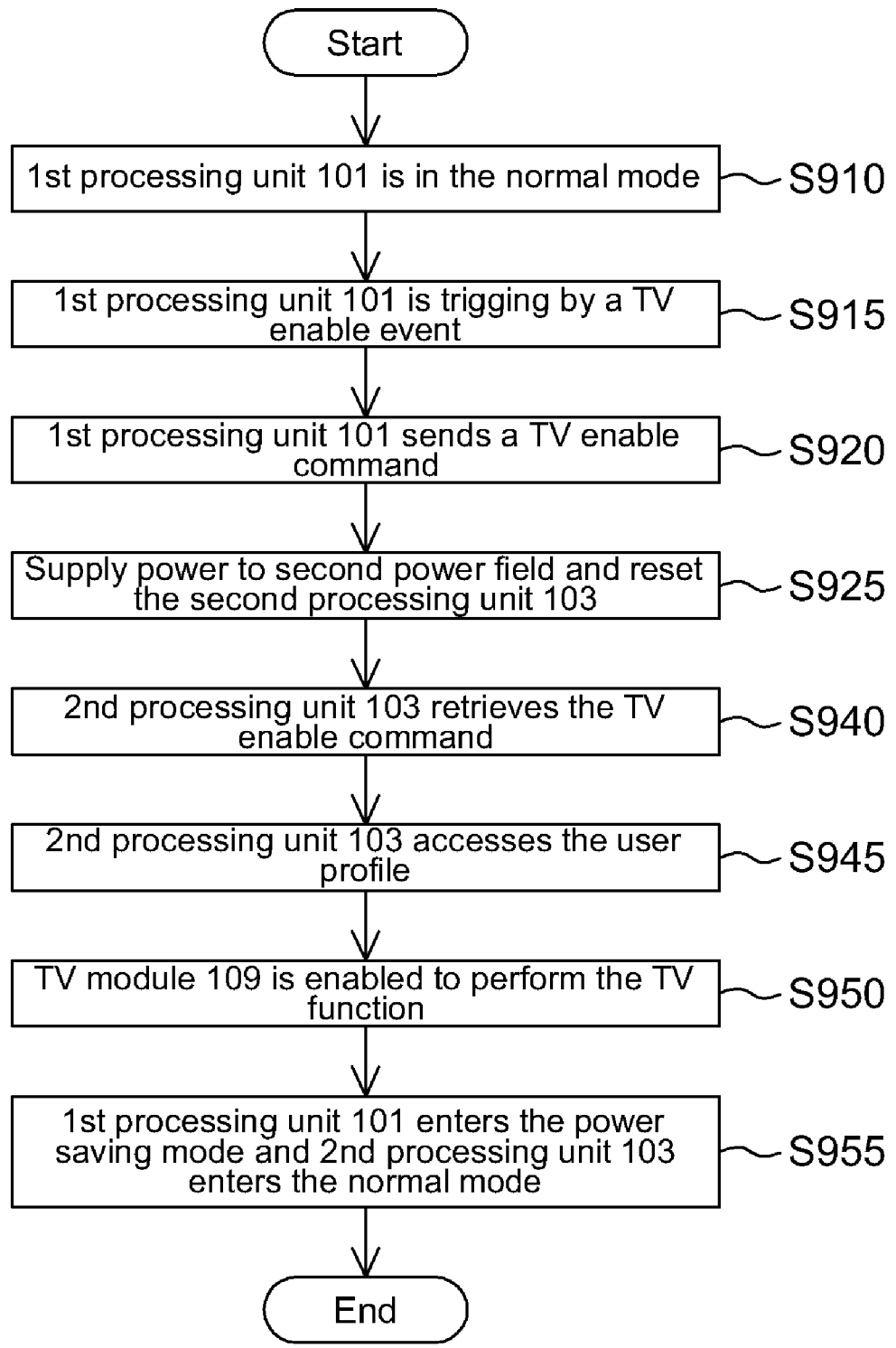
FIG. 9 is a flow chart of activating a TV function according to a second embodiment of the present invention.

FIG. 9 is a flow chart of activating the TV function according to the second embodiment of the present invention. In Step S910, the first processing unit 101 is in the normal mode and the second processing unit 103 is powered off to enter the power saving mode. In Step S915, the user triggers a TV enable event.

In Step S920, the first processing unit 101 sends a TV enable command in response to the TV enable event triggered by the user. In Step S925, the power supply is provided to the second power field, so as to reset the second processing unit 103.

In Step S940, after the second processing unit 103 is reset, the second processing unit 103 retrieves the TV enable command from the memory 116 or the mailbox 310.

In Step S945, the second processing unit 103 accesses the user profile from the storage device 114.

In Step S950, hardware, related to the TV function, such as the TV module 109, is enabled to perform the TV function.

In Step S955, while the user watches TV and the navigation function is not needed temporarily, the first processing unit 101 enters the power saving mode. Furthermore, the second processing unit 103 enters the normal mode to control the TV function of the PND 800.

Figure 10:
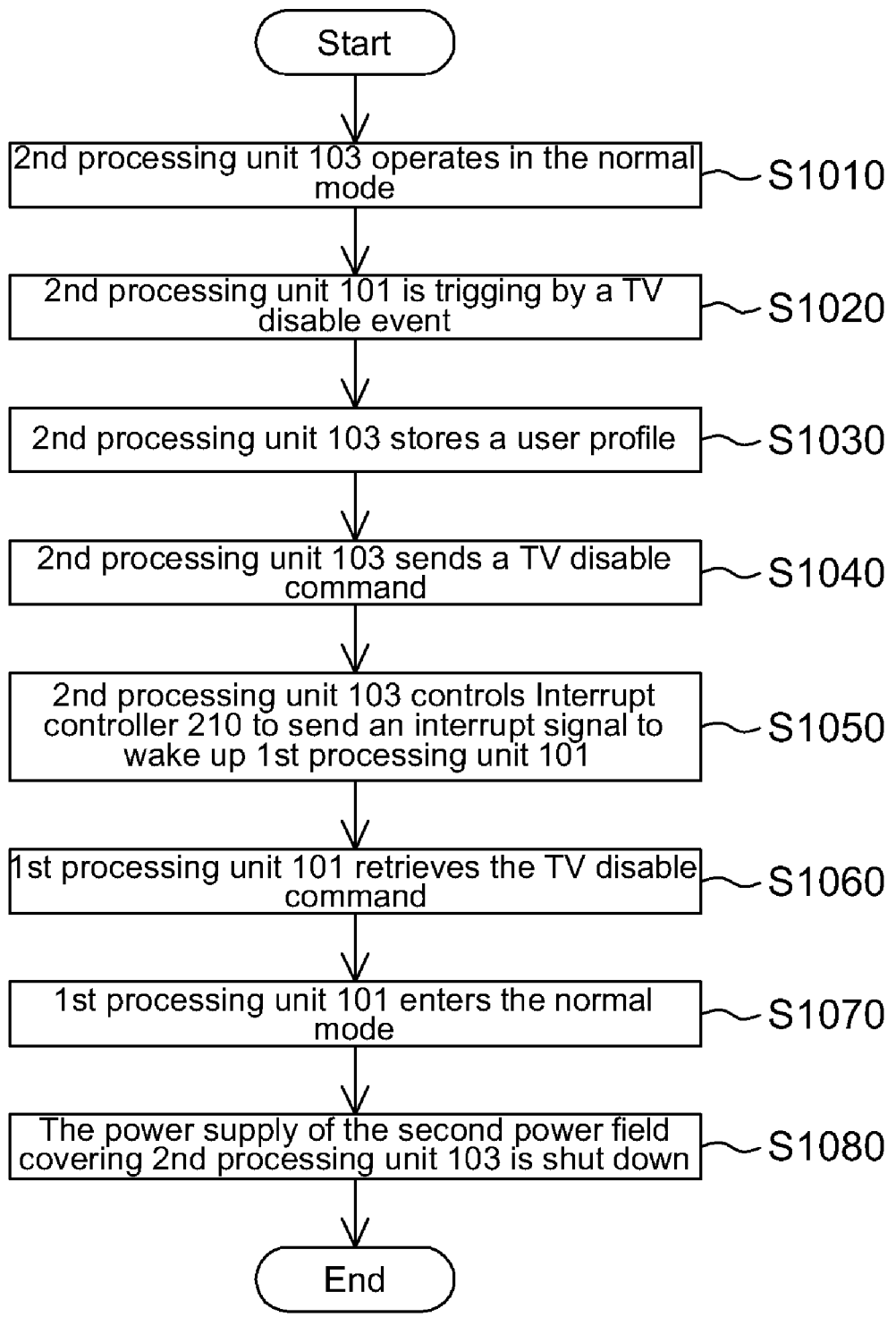
FIG. 10 is a flow chart of deactivating a TV function by a user according a second embodiment of the present invention.
Figure 11:
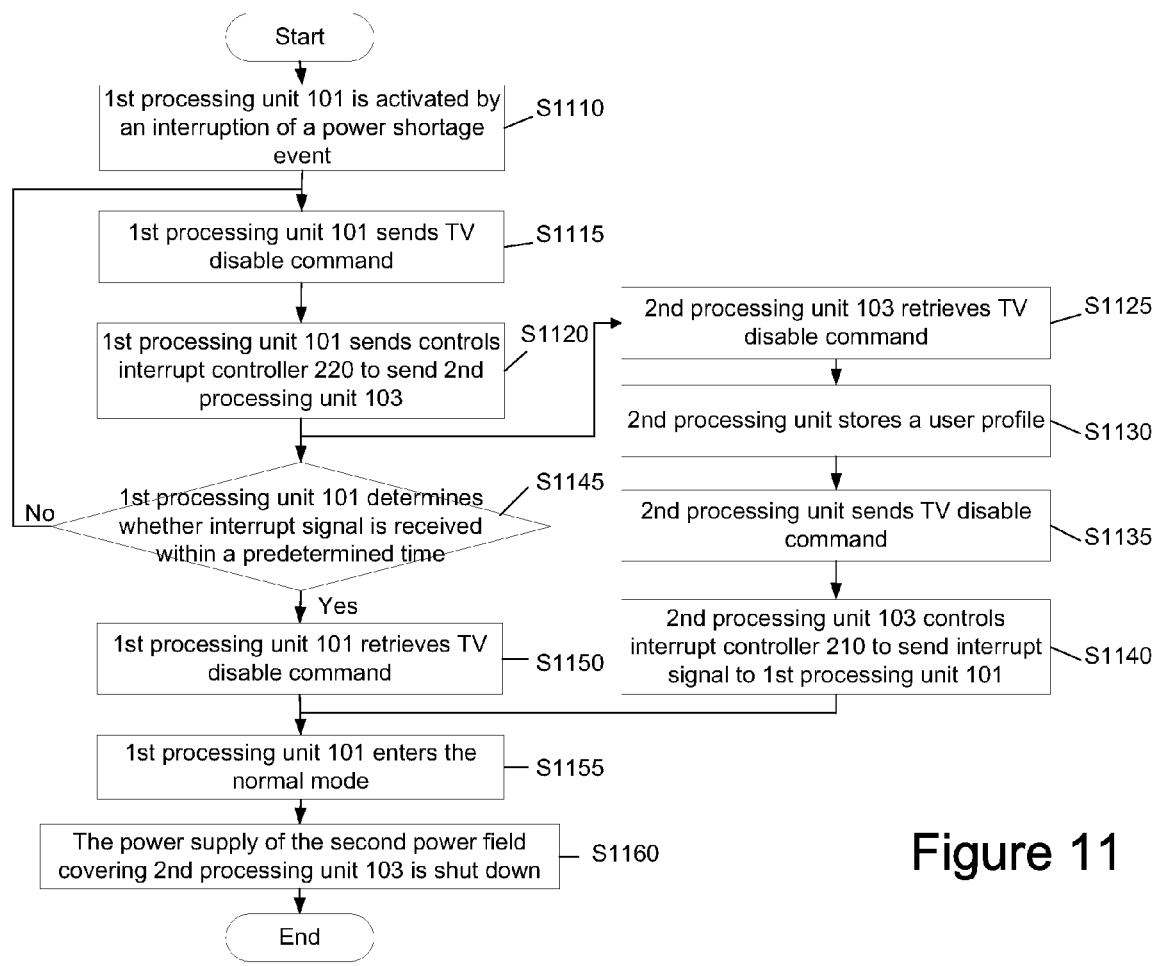
FIG. 11 is a flow chart of deactivating a TV function resulting from power shortage according a second embodiment of the present invention.

Refer to FIGS. 10 and 11 to obtain a better understanding of a TV display deactivating method according to the second embodiment of the present invention.

FIG. 10 is a flow chart of deactivating the TV function by the user according to the second embodiment of the present invention. In Step S1010, when the user watches TV via the PND 800, the second processing unit 103 operates in the normal mode and the first processing unit 101 operates in the power saving mode. In Step S1020, the user triggers a TV close event.

In Step S1030, the second processing unit 103 stores a user profile. In Step S1040, the second processing unit 103 sends a TV disable command.

In Step S1050, the second processing unit 103 controls the interrupt controller 210 and sends an interrupt signal to wake up the first processing unit 101. In Step S1060, the first processing unit 101 retrieves/receives the TV disable command. In Step S1070, the first processing unit 101 enters the normal mode and controls the PND 100 to deactivate the TV function according to the retrieved TV disable command. In Step S1080, under control of the first processing unit 101, the power supply of the second power field covering the second processing unit 103 is shut down.

FIG. 11 is a flow chart of deactivating the TV function resulting from having power shortage according to the second embodiment of the present invention. In Step S1110, an interruption from a power shortage event wakes up the first processing unit 101. In Step S1115, the first processing unit 101 sends a TV disable command indirectly transmitted to the second processing unit 103 to deactivate the TV function.

In Step S1120, the first processing unit 101 controls the interrupt controller 220 to send an interrupt signal to the second processing unit 103.

In Step S1125, the second processing unit 103 retrieves the TV disable command.

In Step S1130, the second processing unit 103 stores a user profile. In Step S1135, the second processing unit 103 sends the TV disable command indirectly transmitted to the first processing unit 101.

In Step S1140, the second processing unit 103 controls the interrupt controller 210 to send the interrupt signal to the first processing unit 101. In Step S1145, the first processing unit 101 determines whether the interrupt signal is received in a predetermined period. The result of no from Step S1145 means that the second processing unit 103 does not receive the TV disable command so that the first processing unit 101 sends the TV disable command again and the flow returns to Step S1115. The result of yes from Step S1145 means that the second processing unit 103 receives the TV disable command and the flow proceeds to Step S1150.

In Step S1150, the first processing unit 101 retrieves the TV disable command.

In Step S1155, the first processing unit 101 enters the normal mode and controls the PND 800 to deactivate the TV function according to the retrieved TV disable command. In Step S1160, under control of the first processing unit 101, the power supply of the second power field covering the second processing unit 103 is shut down.

In conclusion, according to the embodiments of the present invention, a PND having two processing units needs less elements by sharing a display interface, a sound interface, a bus and so on. Compared to the prior art, the embodiments at least achieves advantages of having low cost, small circuit area, simple design and low power consumption. In addition, according to the embodiments of the present invention, the two processing units respectively process a navigation function and a TV function so that each of the processing units need not have a high computation capability. Moreover, the navigation function and the TV function can be simultaneously performed smoothly via the two processing units according to the embodiments of the present invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A portable navigation device (PND) with a TV function, comprising:
   a data bus;
   a TV module, coupled to the data bus, for receiving and processing a TV signal to generate a baseband TV signal;
   a navigation module, coupled to the data bus, for receiving and processing a satellite signal to generate position data;
   a display module, coupled to the data bus, for displaying an image associated with one of the baseband TV signal and the position data;
   a sound module, coupled to the data bus, for playing sound associated with one of the baseband TV signals and the position data;
   a general storage module, coupled to the data bus, for storing TV programs and TV data, and navigation programs and position data;
   a first processing unit, coupled to the data bus, for executing the navigation program to control the navigation module, the sound module, the display module, and the general storage module, and for generating a first TV command according to a TV enable signal;
   a second processing unit, coupled to the data bus, for executing the TV program to control the TV module, the sound module, the display module, and the general storage module, and for generating a second TV command according to a TV disable signal;
   a TV command storage module, coupled to the data bus, for storing the first TV command and the second TV command;
   a first interrupt controller, coupled to the first processing unit, for generating a first interrupt signal to the first processing unit according to the second TV command; and
   a second interrupt controller, coupled to the second processing unit, for generating a second interrupt signal to the second processing unit according to the first TV command;
   wherein the TV command strage module is a mailbox coupled to the data bus, the first interrupt controller and the second interrupt controller;
   wherein, when the first processing unit receives the TV enable signal, the first processing unit sends the first TV command to the mailbox via the data bus, the mailbox triggers the second interrupt controller to generate and to send the second interrupt signal to the second processing unit, and the second processing unit retrieves the first TV command stored in the mailbox; and when the second processing unit receives the TV disable signal, the second processing unit sends the second TV command to the mailbox via the data bus, the mailbox triggers the first interrupt controller to generate and to send the first interrupt signal to the first processing unit, and the first processing unit retrieves the second TV command stored in the mailbox.

2. The PND as claimed in claim 1, wherein the TV command storage module is a memory shared by the first processing unit and the second processing unit.

3. The PND as claimed in claim 1, further comprising:
a first power supply and management module, for providing a power to the display module, the sound module, the TV command storage module, the general storage module, the navigation module, the first processing unit, and the first interrupt controller; and
a second power supply and management module, for providing a power to the TV module, the second processing unit, and the second interrupt controller.

4. A processing module, applied to a PND with a TV function, wherein the PND comprises a navigation module, a TV module, a storage module, a sound module, and a display module, the processing module comprising:
a data bus;
a display interface, coupled to the data bus, for controlling the display module to display image data associated with one of a baseband TV signal and position data;
a sound interface, coupled to the data bus, for controlling the sound interface to play sound associated with one of the baseband TV signal and the position data;
a general storage interface, coupled to the data bus, for controlling the storage module to store TV programs and TV data, navigation programs and position data;
a first processing unit, coupled to the data bus, for executing navigation programs to control the navigation interface, the sound interface, the display interface, and the general storage interface, and for generating a first command according to a TV function enable signal;
a second processing unit, coupled to the data bus,
for executing the TV programs,
for controlling the TV module,
for controlling the sound module, the display module, and the storage module via the sound interface, the display interface, and the storage interface, and
for generating a second command according to a TV function disable signal;
a TV command storage module, coupled to the data bus, for storing the first TV command and the second TV command;
a first interrupt controller, coupled to the first processing unit, for generating and sending a first interrupt signal to the first processing unit; and
a second interrupt controller, coupled to the second processing unit, for generating and sending a second interrupt signal to the second processing unit;
wherein the TV command storage module is a mailbox coupled to the bus, the first interrupt controller, and the second interrupt controller;
wherein, when the first processing unit receives the TV enable signal, the first processing unit sends the first TV command to the mailbox via the data bus, the mailbox triggers the second interrupt controller to generate and to send the second interrupt signal to the second processing unit, and the second processing unit retrieves the first TV command stored in the mailbox; and when the second processing unit receives the TV disable signal, the second processing unit sends the second TV command to the mailbox via the data bus, the mailbox triggers the first interrupt controller to generate and to send the first interrupt signal to the first processing unit, and the first processing unit retrieves the second TV command stored in the mailbox.

5. The processing module as claimed in claim 4, wherein the TV command storage module is a memory shared by the first processing unit and the second processing unit.

6. A method for operating a portable navigation device (PND) with a television (TV) function, comprising:
receiving a TV signal and processing the TV signal to generate a baseband TV signal, implementing a TV module;
receiving a satellite signal and processing the satellite signal to generate position data, implementing a navigation module;
displaying an image and playing sound associated with one of the baseband TV signal and the position data, on an image module and a sound module, respectively;
storing at least TV programs, TV data, navigation programs, and position data in a general storage module;
executing at least one navigation program using a first processing unit, to control the navigation module, the display module, the sound module, and the general storage module, and generating a first TV command according to a TV enable signal;
executing at least one TV program using a second processing unit, to control the TV module, the display module, the sound module, and the general storage module, and generating a second TV command according to a TV disable signal;
storing the first TV command and the second TV command in a TV command storage module;
generating a first interrupt signal for executing the at least one navigation program according to the second TV command using a first interrupt controller; and
generating a second interrupt signal for executing the at least one TV program according to the first TV command using a second interrupt controller;
wherein, the TV command storage module is a mailbox coupled to the first interrupt controller and the second interrupt controller;
wherein, when the TV enable signal is received by the first processing unit, the first processing unit sends the first TV command to the mailbox, the mailbox triggers the second interrupt controller to generate and send the second interrupt signal to the second processing unit, and the second processing unit retrieves the first TV command stored in the mailbox;
wherein when the the TV disable signal is received by the second processing unit, the second processing unit sends the second TV command to the mailbox, the mailbox triggers the first interrupt controller to generate and send the first interrupt signal to the first processing unit, and the first processing unit retrieves the second TV command stored in the mailbox.

* * * * *